United States Patent [19]
Lähteenmäki

[11] Patent Number: 6,039,446
[45] Date of Patent: Mar. 21, 2000

[54] FACE SHIELD, INCORPORATING A WRIST WATCH DISPLAY

[75] Inventor: Ari Lähteenmäki, Helsinki, Finland

[73] Assignee: Suunto Oyj, Espoo, Finland

[21] Appl. No.: 09/191,285

[22] Filed: Nov. 12, 1998

[30] Foreign Application Priority Data

Nov. 28, 1997 [FI] Finland ..................... 974367

[51] Int. Cl.[7] .................................................. G02C 1/00
[52] U.S. Cl. ............................................. 351/43; 351/41
[58] Field of Search ................................ 351/43, 57, 58, 351/41, 158

[56] References Cited

U.S. PATENT DOCUMENTS 4,776,045 10/1988 Mysliwiec et al. .
5,033,818 7/1991 Barr .
5,446,506 8/1995 Dawkins, Jr. ............................. 351/43

FOREIGN PATENT DOCUMENTS

WO 88/06549 9/1988 Australia .
2277451 11/1994 United Kingdom .
2283333 5/1995 United Kingdom .

Primary Examiner—Huan Xuan Dang
Attorney, Agent, or Firm—Leydig, Voit & Mayer, Ltd.

[57] ABSTRACT

The invention relates to a face shield comprising a lens. In order for the shield to have versatile properties and a simple structure and to utilize various apparatuses provided with a display, the shield comprises holding means for detachably receiving a wrist watch-shaped apparatus including a display, and optical apparatuses for displaying information provided by the display in a lens area. The shield is then preferably a diver's mask and the apparatus is a dive computer. The holding means preferably comprise a frame portion and instant attachment means.

20 Claims, 1 Drawing Sheet

FACE SHIELD, INCORPORATING A WRIST WATCH DISPLAY

BACKGROUND OF THE INVENTION

The invention relates to a face shield comprising a lens.

Different shields to be fitted on the face are known. For example, masks are used by divers, fire fighters and soldiers, the structure of which varies depending on the purpose of use. Face and eye shields used by motorcyclists, cyclists, welding workers (e.g. a helmet with a visor) and other shields are also known. The present invention may be used with these types of devices.

In all of the above applications, the object of the shield is to protect a person from exceptional environmental strains. It will be appreciated that it is often useful for a person using protection to obtain information on environmental and other conditions so as to be able to work in the prevailing exceptional environment in an appropriate manner. For divers, in particular, it is useful to obtain plenty of information about diving.

In the following, a closer look will be taken at a shield in the form of a diving mask, since the invention is particularly focused, although not entirely, on such an application.

At present, diving masks include a display providing a diver with important information on diving such as depth and time of dive. The idea of the display including a dive computer is to make diving safer and to sensibly utilize the properties of the diving equipment and the diver. Dive computers thus offer information on, for example, a safe ascent rate so that the diver manages to avoid the dangers caused by ascending too fast.

GB patent application 2,277,451 discloses a diving mask to which a computer and optical means are integrated in order to provide the lens of the mask with said diving information.

GB patent application 2,283,333 discloses a diving mask including optical means integrated to it in order to provide the lens of the mask with said diving information. The computer controlling the display is either coupled to the diver's wrist or to the diver's air supply apparatus.

U.S. Pat. No. 5,033,818 discloses a diving system including a dive computer attached to an air tank and a wire which directs signals arriving from the dive computer onto the display in the diving mask, and from here onwards through optical means to the lens of the mask to be viewed by the diver.

International application WO 88/106549 discloses a diving system comprising a dive computer and means for providing a signal wirelessly on the display. The display is either in the mask or apart from it.

Professionals in diving also know a wrist-mounted relatively compact dive computer provided with a display, the design of which resembles a conventional wrist watch and like the conventional wrist watch includes straps and a time display. Such an apparatus is marketed by Suunto Oyj and is referred to as SPYDER and is known as a dive computer watch. The dive computer watch is also associated with abbreviation ACW, which is short for Advanced Computer Watch. The dive computer watch informs about various dive data, such as depth, time, stages of dive and ascent rate. The watch functions of the apparatus are versatile. The dive computer watch is mostly kept on the wrist for telling time, in which case the apparatus has a certain status symbol. The value of the apparatus is in fact so great that it is purchased by other people as well, not only by active divers. When the apparatus is used during a dive it is still mounted on the wrist in a conventional manner.

All the above apparatuses are relatively expensive. The last mentioned one, or the dive computer watch, however, stands out from the other dive computer apparatuses, as it functions as a very reliable watch as well, and can be used everyday. Thus, it is a versatile device with value beyond diving.

BRIEF DESCRIPTION OF THE INVENTION

It is an object of the present invention to provide face shield which has more versatile properties and/or a simpler structure than prior art shields and can utilize not only various already existing, but also future, apparatuses provided with a display. In order to carry this out, the present invention is characterized in that the shield comprises holding means for detachably receiving a wrist watch-shaped apparatus including a display, and optical apparatuses for displaying information provided by the display in an area of the lens.

The holding means preferably comprise a frame portion and instant attachment means, i.e. quick coupling means, whereby the apparatus can be easily and rapidly detached from the holding means.

A particularly substantial application of the invention is a shield for divers. This preferred embodiment of the invention is characterized in that the shield is a diver's mask and that the apparatus is a dive computer. The display of the dive computer provides information about diving, like depth and time of dive. Said embodiment of the invention further increases the advantages of a known dive computer, such as versatility and easy usage, compared to other dive computer systems. Preferred embodiments of the mask according to the invention are presented in the attached claims.

The most important advantages of the shield of the invention are that the shield has versatile properties and a simple base structure and can utilize various already existing, but also future, apparatuses provided with a display. An important example of such an apparatus is a wrist watch-shaped dive computer which can be easily attached to a place where its display can be constantly observed during a dive, and the voice signals provided by the dive computer are easily audible as the dive computer is close to the diver's ear. Such a wrist watch-shaped dive computer is, if desired, easy to detach to be alternatively used as a watch representing a status symbol.

BRIEF DESCRIPTION OF THE DRAWINGS

In the following the invention will be described in greater detail by means of a preferred embodiment with reference to the attached drawing, in which.

DETAILED DESCRIPTION OF THE INVENTION

Figure 1:
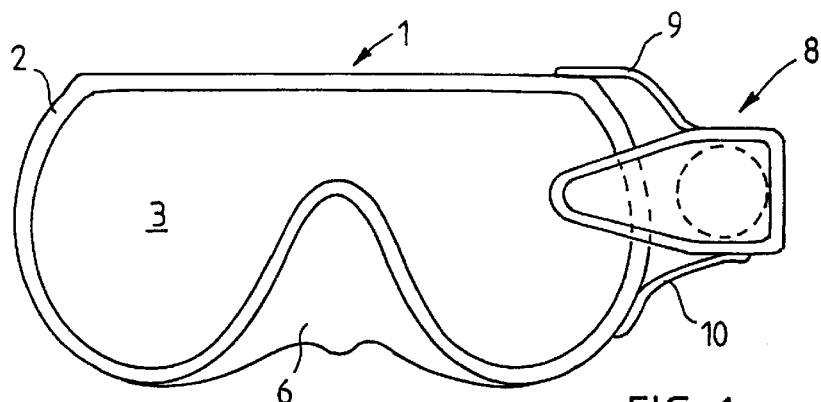
FIG. 1 shows a front view of a diver's mask of the invention.
Figure 2:
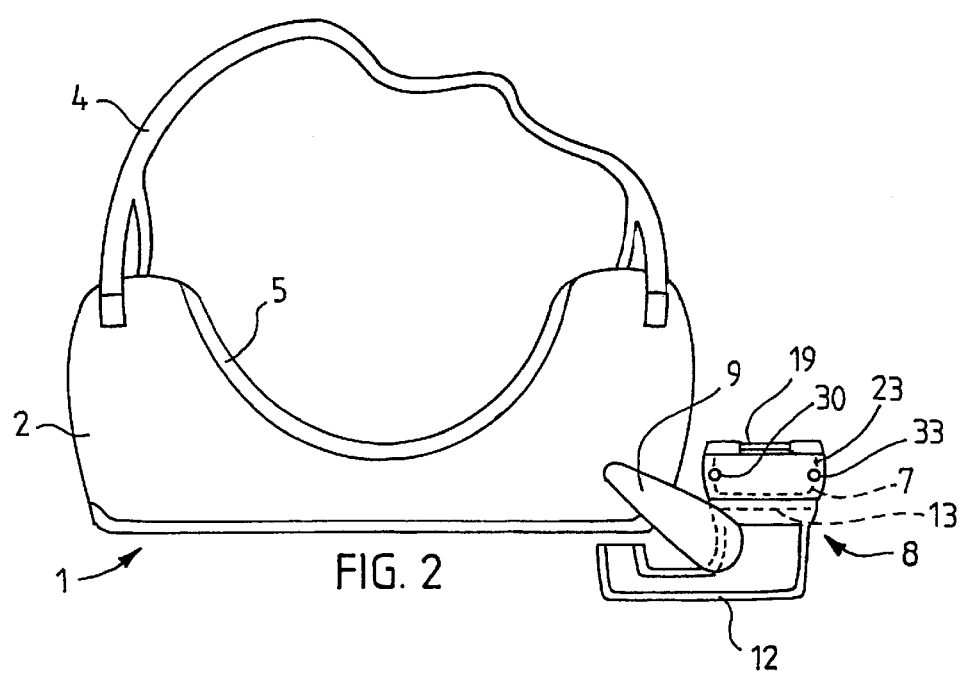
FIG. 2 shows a top view of the mask in FIG. 1.

FIGS. 1 and 2 show a diver's mask, indicated by reference number 1. The mask 1 comprises a face mask 2 of flexible material, a lens 3 and a fastening string 4. A soft seal 5 and a nose portion 6 attend to the fact that the mask remains watertight and airtight when fitted on the face of the user.

A wrist watch-shaped dive computer watch 7 is attached to the other side of the face mask 2 indicated by dotted lines in FIG. 2. Such a dive computer watch is marketed by Suunto Oyj and is referred to as SPYDER. This dive computer watch is also associated with abbreviation ACW which is short for Advanced Computer Watch. The dive computer watch 7, hereinafter also referred to as a watch, comprises a processor controlled display 11 providing information about various diving data, such as ascent rate. The watch 7 can be arranged to receive information, with or without a wire, on air tank pressure used during a dive and providing the display 11 with the same information. The watch functions of the watch 7 are versatile.

The dive computer watch 7 is arranged to the holding means generally indicated by reference number 8. The holding means 8, in turn, is attached to the face mask 2 with two fasteners 9 and 10 which are attached to the face mask, for example, by a snap connection. When the watch 7 is attached in accordance with the Figure on the side of the face mask, the voice signals provided by the watch are easily audible to the diver, which increases the safety of the apparatus and improves its properties of use.

A processor controlled display 11 of the dive computer watch 7 can be seen in the area of the lens 3 using optical apparatuses 12. The structures of the optical apparatuses 12 are such that they include the necessary lenses and mirrors so that an enlarged image of the display 11 of the watch 7 can be seen in the correct direction (not as a mirror image) through the lens 3. On account of the enlargement, the diver is not required to have particularly good eyesight. Since the structure of the optical apparatuses applies solutions which are within the purview of those skilled in the art, they are not described in greater detail in this context. However, it can be mentioned that a lens 13, indicated by a dofted line in FIG. 2 is arranged in front of the watch 7, the surface of the lens indicating a watch is substantially planar, since it is in touch with water when the mask 1 is being used. Due to the planar shape of the lens 13 it refracts correctly. The opposite side of the lens 13 is convex.

Figure 3:
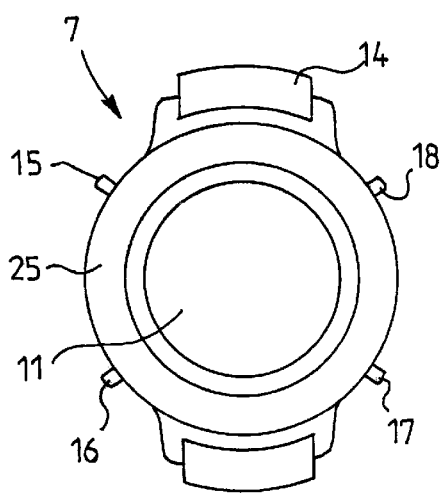
FIG. 3 shows a dive computer watch attached to the mask in FIG. 1

FIG. 3 shows an enlargement of the dive computer watch 7 used in the mask of FIG. 1. The Figure shows a strap 14 of the watch which is removed before the watch is mounted on the holding means 8. The structure of the holding means 8 is such that it enables the reception of the watch including the straps 14, but it is recommended to remove the strap 14 before attaching the watch to the mask 1. Reference numbers 15–18 indicate buttons by which the functions of the dive computer watch are controlled.

Figure 4:
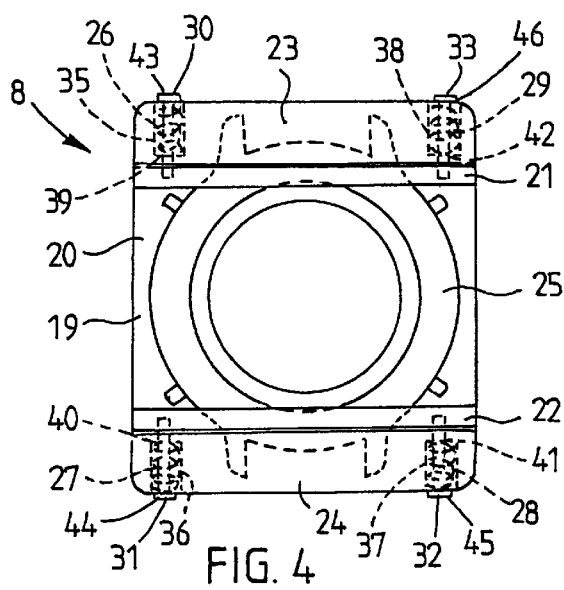
FIG. 4 shows a detail of the mask in FIG. 1.

FIG. 4 shows the dive computer watch 7 mounted inside the holding means 8. The holding means 8 comprises a frame portion 19 including a back plate 20 with protrusions 21, 22 and compression parts 23, 24 arranged to diametrically exert compression on a frame 25 of the watch 7 from opposite directions. Said compression keeping the watch 7 firmly on the holding means 8 is accomplished using four helical compression springs 26–29 and screws 30–33 arranged therein. The screws 30–33 and the compression springs 26–29 are mounted into indentations 35–38 made on the compression parts 23, 24 indicated by dotted lines. A first end of the screws 30–33 is fastened to the spirals of the protrusions 21, 22. A first end of the compression springs 26–29 is arranged to be supported on the bases of the indentations forming stops 39–42. A second, opposite end, of the compression springs 26–29 is arranged to be supported on heads 43–46 of the screws 30–33 or on some other stops formed on the screw. Said system ensures that the compression parts 23, 24 can be drawn away from the frame portion 19 so as to be able to detach the watch 7 from the holding means 8 and to reattach it, if desired, without having to fully detach the compression parts 23, 24 from the frame portion 19. As the compression parts 23, 24 are drawn away from, i.e. displaced from, the frame portion 19, the compression springs 26–29 are compressed in accordance with the displacement of the compression parts from the frame portion.

The holding means 8 including the compression parts 23, 24 is naturally formed in such a manner that the buttons 15–18 of the watch 7, which are important for the dive, can freely be used when carrying out a dive.

The holding means 8 is preferably made of plastic except for the compression springs 26–29 and the screws 30–33.

The invention has above been described by means of one embodiment only and it is therefore pointed out that the details of the invention can be implemented in various ways within the scope of the attached claims. Therefore the apparatus to be attached to the shield or the mask does not necessarily have to be a dive computer watch, but can be a mere watch, a navigation apparatus, an altimeter, a speedometer, a pulse rate meter etc. The design and structure of the holding means may differ considerably from what has been presented. Hence it may be thought that there is only one spring loaded compression part compressing the frame of the dive computer watch (or another apparatus shaped as a wrist watch). However, using two compression parts provides the advantage that small compression parts can be used enabling a small-size holding means naturally without obstructing the display of the computer watch (or another apparatus). Instead of the screws 30–33 other appropriate locking elements can be used. Although it may be thought that the holding means does not comprise instant attachment means for fastening the watch (or another apparatus) it is, however, highly recommended that the attachment means are instant attachment means which do not require the diver (or another user like a motorcyclist) to use any tools. The invention can also be implemented in such a manner that the holding means comprise elements that can be attached to the lugs of the watch (or another apparatus) by the same principle by which the strap/s of the watch is/are attached to the lugs. It may also be thought that the watch (or another apparatus) including strap/s is attached to the holding means so as to utilize the strap/s when attaching the watch (or apparatus). Information about diving (or other display values) do not have to take place outside the mask (or another shield) through the holding lens, but can take place inside the lens or at the lens level.

What is claimed is:

1. A face shield for detachably receiving a wrist watch-shaped apparatus including a display, said face shield comprising a lens, holding means for detachably receiving said wrist watch-shaped apparatus, and an optical apparatus disposed to visually couple the display to the lens whereby information provided by the display is transmitted to an area of the lens.

2. A face shield as claimed in claim 1, wherein the holding means comprises a frame portion and instant attachment means.

3. A face shield as claimed in claim 2, wherein the instant attachment means comprises at least one compression part and at least one biasing spring disposed to expert a biasing force on the compression part, said compression part being disposed such that said compression part may exert compression on the wrist watch-shaped apparatus and whereby the biasing force on the wrist watch-shaped apparatus may be overcome such that the compression part can be drawn away from the frame portion in order to detach the wrist watch-shaped apparatus from the instant attachment means.

4. A face shield as claimed in claim 3, wherein the instant attachment means comprises at least two spring loaded compression parts arranged to diametrically exert compression on the wrist watch-shaped apparatus from opposite directions.

5. A face shield as claimed in claim 4, wherein the instant attachment means comprises four longitudinal attachment elements, said attachment elements being arranged in pairs into the corresponding compression parts and being disposed to engage the frame portion, the attachment elements being disposed within the biasing springs such that the biasing force resists drawing the compression parts away from the frame portion.

6. A face shield as claimed in claim 5, wherein the compression parts comprise indentations having a stop, and said attachment elements comprise a stop, the biasing springs being arranged into said indentations formed on the compression parts so as to be supported at one end thereof on said stop in the indentation and at an opposite end thereof on said stop formed on the attachment element.

7. A face shield for divers as claimed in claim 6, wherein the shield is a diver's mask and the apparatus is a dive computer.

8. A face shield for divers as claimed in claim 5, wherein the shield is a diver's mask and the apparatus is a dive computer.

9. A face shield for divers as claimed in claim 4, wherein the shield is a diver's mask and the apparatus is a dive computer.

10. A face shield for divers as claimed in claim 3, wherein the shield is a diver's mask and the apparatus is a dive computer.

11. A face shield for divers as claimed in claim 2, wherein the shield is a diver's mask and the apparatus is a dive computer.

12. A face shield as claimed in claim 1, wherein the wrist watch includes straps and the holding means are arranged to receive the wrist watch-shaped apparatus and straps thereof.

13. A face shield for divers as claimed in claim 7, wherein the shield is a diver's mask and the apparatus is a dive computer.

14. A face shield as claimed in claim 1, wherein the lens further comprises side edges, the holding means being arranged on one side edge of the shield, the holding means being disposed remote the lens.

15. A face shield for divers as claimed in claim 8, wherein the shield is a diver's mask and the apparatus is a dive computer.

16. A face shield as claimed in claim 1, wherein the optical apparatus is attached to the holding means, the optical apparatus comprising a convex lens whereby the optical apparatus provides an enlarged image from the display of the apparatus through the lens of the shield.

17. A face shield as claimed in claim 16, wherein the optical apparatus comprises an optical lens positioned in front of the display of the wrist watch-shaped apparatus, the surface of said optical lens facing the apparatus being substantially planar.

18. A face shield for divers as claimed in claim 10, wherein the shield is a diver's mask and the apparatus is a dive computer.

19. A face shield for divers as claimed in claim 9, wherein the shield is diver's mask and the apparatus is a dive computer.

20. A face shield for divers as claimed in claim 1, wherein the shield is a diver's mask and the apparatus is a dive computer.

* * * * *